United States Patent
He et al.

(10) Patent No.: US 7,401,730 B2
(45) Date of Patent: Jul. 22, 2008

(54) SELF-SERVICE DEPOSIT METHOD AND APPARATUS

(75) Inventors: Chao He, Dundee (GB); Gary Ross, Edinburgh (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 11/521,670

(22) Filed: Sep. 15, 2006

(65) Prior Publication Data

US 2008/0126106 A1    May 29, 2008

(51) Int. Cl.
*G06Q 40/00*    (2006.01)
(52) U.S. Cl. .................. 235/379; 705/43; 705/44; 705/45; 283/57
(58) Field of Classification Search .............. 235/379; 705/43–45; 283/57
See application file for complete search history.

(56) References Cited

U.S. PATENT DOCUMENTS

| | | | |
|---|---|---|---|
| 5,807,625 A * | 9/1998 | Amon et al. ........... 428/195.1 |
| 6,748,101 B1 * | 6/2004 | Jones et al. ........... 382/135 |
| 2003/0085271 A1 * | 5/2003 | Laskowski ........... 235/379 |
| 2003/0116478 A1 | 6/2003 | Laskowski | |
| 2004/0083175 A1 * | 4/2004 | Bellucci ........... 705/43 |
| 2004/0084521 A1 * | 5/2004 | Nagayoshi et al. ...... 235/379 |

FOREIGN PATENT DOCUMENTS

| EP | 1 413 992 A2 | 4/2004 |
|---|---|---|
| FR | 2 683 929 | 5/1993 |
| GB | 2 272 861 A | 6/1994 |
| WO | WO 00/23952 | 4/2000 |
| WO | WO 03/103983 | 12/2003 |
| WO | WO 2005/106806 A2 | 11/2005 |

* cited by examiner

*Primary Examiner*—Steven S Paik
*Assistant Examiner*—Tuyen K Vo
(74) *Attorney, Agent, or Firm*—Michael Chan

(57) ABSTRACT

A self-service deposit terminal for bank notes, in the deposited notes are subjected to an acceptance procedure in which the deposited notes are passed through a note validator and a decision is made regarding the validity of the notes, so as to differentiate between: a) authentic notes; b) counterfeit notes; and c) suspect notes. Reject notes are then separated from authentic notes and diverted to a purge bin. On route to the purge bin counterfeit notes are marked, so as to render them unusable and suspect notes are marked without rendering them unusable.

18 Claims, 2 Drawing Sheets

SELF-SERVICE DEPOSIT METHOD AND APPARATUS

TECHNICAL FIELD OF THE INVENTION

The present invention relates to a self-service deposit method and apparatus for receiving media including bank notes.

BACKGROUND OF THE INVENTION

A deposit apparatus for receiving bank notes may be included in an automated teller machine (ATM). It is known for an ATM of this type to dispense bank notes that have earlier been deposited at the ATM, such ATMs being known as recycling ATMs.

Known self-service deposit terminals for receiving loose bank notes (in contrast with notes contained in envelopes) subject the notes to a validation procedure. One or more of the deposited notes may be rejected on the grounds that they are damaged, dirty or forged, and the rejected notes are either captured by the ATM for further manual verification or returned to the user according to the regulations of different countries.

When bank notes are deposited in an automatic recognition and validation system, such as the GBNA or GBRU, the notes have to be categorized, if recognized, as: a) genuine; b) counterfeit; or c) suspect, if that system is to comply with the requirements of certain countries (e.g. Germany). Genuine and counterfeit categories are decisive and the result attributable to the person depositing the notes at that time. However, the suspect category requires subsequent, usually manual, re-assessment. If all notes considered suspect fall into the genuine category or they all are found to be counterfeit, then attributing the notes to the person depositing them is straight forward. If however, a number of notes of the same denomination are deposited by different people are subsequently found to be of different categories (some genuine, some counterfeit) then the process of connecting each note with a particular person is more complex. At present, images of the suspect notes are captured and where possible the serial number area is imaged in an attempt to subsequently connect each suspect with a particular transaction and therefore with a particular person so that the face value of counterfeit notes are not credited to the depositor and/or such that criminal investigation can take place. Due to the nature of banknotes (soiling, tears, folds and design (not all notes have serial numbers on both sides), differentiation between one suspect and another is not always possible. This is compounded as each note, even if re-entered to the deposit machine to try to repeat the process, will undoubtedly generate a different image even if transported in the correct orientation. Due to the limit of allocated memory size, the total amount of images can be stored is restricted, which increases the chance of ATM being out of service.

SUMMARY OF THE INVENTION

It is an object of the present invention to provide an improved self-service deposit method and apparatus.

It is an additional object of the present invention to provide a deposit apparatus that addresses the problem of identifying counterfeit or suspect bank notes or other media with an intrinsic value.

According to one aspect of the present invention there is provided apparatus comprising: means for receiving deposited notes; transport means for transporting the notes; note validation means for determining if a deposited note is counterfeit or suspect note; a purge bin for receiving counterfeit and suspect notes; and means for marking both counterfeit and suspect notes to identify them as such including marking the suspect notes with a photo-chromic or thermo-chromic ink, so as to render them usable again if they are later proved to be genuine.

Preferably, the means for marking notes includes means for staining the notes with ink. Most preferably, the means for marking notes includes a printer for printing on the notes.

In one embodiment the apparatus is arranged to mark counterfeit notes so as to render them unusable Preferably, the apparatus is an automated teller machine (ATM).

In one embodiment the ATM further comprises means for identifying a user of the ATM. Also, the apparatus further comprises means for identifying the circumstance of the deposit including one or more of time, date, location, and monetary value of the media deposited.

Preferably the printer is arranged to print information regarding a user of the ATM who deposited the media and the circumstances of the deposit of the media.

Preferably the information is printed as an encrypted form e.g. a barcode.

According to a second aspect of the present invention there is provided a method of handling notes at an automated teller machine (ATM), the method comprising the steps of: subjecting notes to an acceptance procedure; separating rejected notes from accepted notes, wherein reject notes include counterfeit and suspect notes; diverting rejected notes to a rejection bin; and marking counterfeit notes so as to render them unusable and marking the suspect notes with a photo-chromic or thermo-chromic ink, so as to render them usable again if they are later proved to be genuine.

Preferably, the method further comprises the step of identifying the particular transaction in which a rejected note was deposited.

Preferably, the method further comprises the step of transmitting rejected note information to a host computer which controls operation of the ATM.

The above and other objects, features, and advantages of the present invention will become apparent from the following description and the attached drawings.

DETAILED DESCRIPTION

Figure 1:
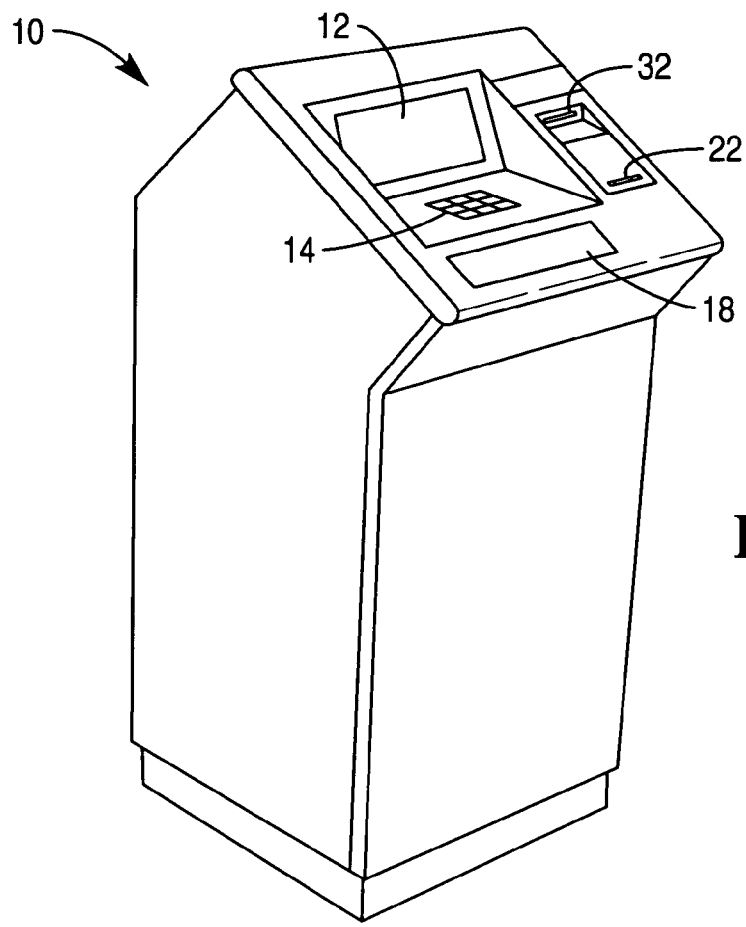
FIG. 1 is a perspective view of a self-service deposit terminal.
Figure 2:
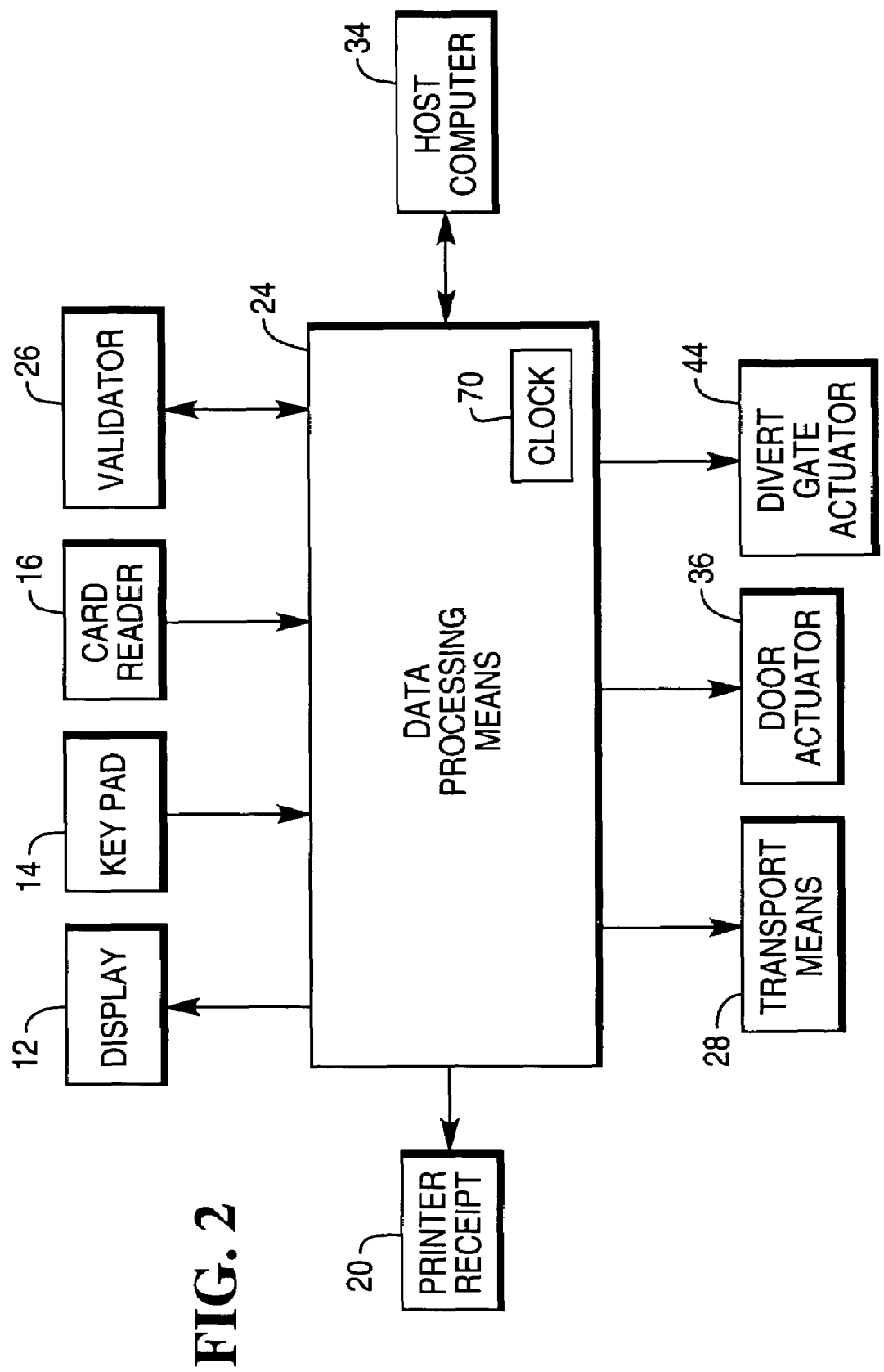
FIG. 2 is a block diagram of the deposit terminal of FIG. 1.

Referring to FIGS. 1 and 2, the self-service deposit terminal 10 shown therein includes a display 12 for displaying user information, a key pad 14 for inputting data, a card reader 16 for receiving a user identity card, a door 18 behind which is a slot in which bank notes can be deposited, a receipt printer 20 for printing a receipt acknowledging a deposit made by a user and for issuing the receipt to the user via a slot 22, and data processing means 24 to which the display 12, the key pad 14, the card reader 16 and the receipt printer 20 are connected. A conventional note validator 26 and note transport means 28 are also connected to the data processing means 24, the transport means 28 serving to transport deposited notes along paths indicated by arrows 30 in FIG. 3 under the control of the data processor means 24.

To make a deposit, a user inserts his identification card in the card slot 32 of the terminal 10. Data contained in a smart card or magnetic strip on the card is read by the card reader 16 and transmitted by the data processing means 24 to a host computer 34. If the host computer 34 authorizes the card, then the data processing means 24 causes the door 18 to be opened by means of a door actuator 36 so as to allow the user to insert into the deposit slot the note or notes which are to be deposited. Also, the user enters details e.g. amount of the deposit by means of the keypad 14. Once the deposit has been made the door 18 closes.

Figure 3:
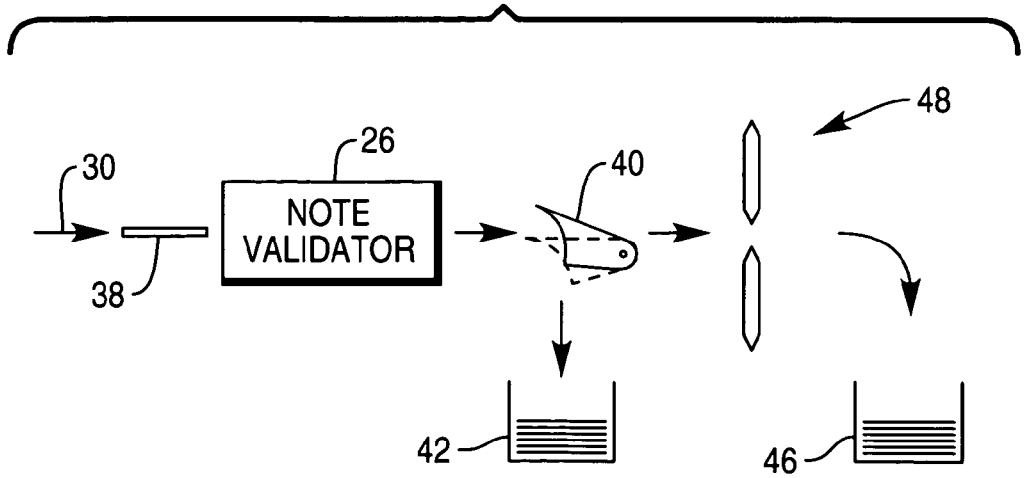
FIG. 3 is a schematic representation of a deposit apparatus in accordance with the invention as described in the terminal of FIGS. 1 and 2.

Referring now to FIG. 3, the deposited notes are separated from each other by conventional separating means (not shown) and individually fed by the transport means 28 (see FIG. 2) to the note validator 26. The note validator 26 makes a determination as to whether each note fed to it, e.g. the note 38 shown in FIG. 3, is valid or invalid.

The note validator 26 also recognizes the value of accepted notes of different denominations and the data processing means 24 uses this information to calculate a total value of the accepted notes deposited.

If a note is accepted as valid by the validator 26 then a divert gate 40 remains in its home position shown in solid outline in FIG. 3 and the note is fed to collection means 42.

If a note is not accepted as valid by the note validator 26, then the data processing means 24 rotates the divert gate 40 into the position shown in chain outline in FIG. 3 by means of an actuator 44 (see FIG. 2), and the note is fed by transport means to a purge bin 46.

On route to the purge bin 46 counterfeit or suspect notes pass through a marking means 48, which is arranged to mark, at least, a portion of the notes.

In one embodiment only counterfeit notes are marked and other rejected notes such as torn or damaged notes, are sent to the purge bin 46 without being marked. In this embodiment clearly counterfeit notes are marked with an indelible ink so as to render them unusable in the future, whilst suspect notes are marked with a "tag" using a photo-chromic or thermo-chromic ink so that it can be traced back absolutely, without visibly marking the note, damaging the note or contaminating it such that subsequent deposition of that note is compromised. In this way suspect, but ultimately genuine notes are not rendered unusable in the future and such a tag can be removed under certain conditions, e.g. exposure under a light with a special wavelength or exposure to heat at a special temperature.

There is no limit to how many suspect notes can be processed (subject to the suspect bin size).

In one embodiment the marking means is an ink staining means, such as an inked roller or rollers. In an alternative embodiment, the marking means is a printer arranged to print information on the notes regarding the details of the deposit of the note and/or the reason for the rejection of the note. The printing is either in a human readable form or in a machine-readable form, such as a bar code, in order to protect customers' privacy and facilitate the future automatic updating of user accounts. The data may include information on the user who deposited the note and/or information on the circumstances of the deposit (time, date, location etc.). The ink is deposited on the moving note in a line to form a specific controlled and unique signature of various length lines and spaces. More complex patterns are also possible but keeping it simple is always beneficial in terms of reliability and cost.

Each note determined as being suspect, whilst being transported is marked with a photo-chromic or thermo-chromic ink. Such ink can be invisible in normal sunlight and only becomes visible in the presence of strong UV or high temperatures out side the normal conditions where notes are handled manually or in automated systems. Hence the addition does not affect the useful life of the note, if ultimately found to be genuine, as described above.

However, it has been found to be preferable in use to print in the visible spectrum, in normal light and heat, as this allows financial institution personal to identify notes easily. The photo-chromic or thermo-chromic ink utilized is preferably one which disappears under appropriately selected heat or light conditions and does not return when normal ambient heat and light conditions are returned. This allows invalid notes to be easily detected whilst allowing valid notes to be cleaned and returned to normal public use. Thermo-chromic inks are more suited to this purpose than photo-chromic inks as clearing the printing on multiple notes can be achieved in one by heating the notes together whereas notes printed with photo-chromic ink must be processed individually to remove unwanted printing.

Once printed the note is then deposited in the suspect bin. If there are any issues regarding the deposited note, the note can be exposed to heat or UV to expose the printing which can then be connected to the deposit and hence the original owner. This is done by a specific tag which is read automatically.

Once all the notes deposited by the customer have either been fed to the collection means 42 or purge bin 46, the data processor means 24 causes the total value of accepted notes deposited to be credited to the user's account identified by the information read off the identification card that had earlier been inserted into the card reader slot 32 (see FIGS. 1 and 2). The receipt printed by the receipt printer 20 includes the total value of the accepted notes deposited. This information may also be passed to the host computer 34 (FIG. 2). It should be understood that a self-service deposit apparatus in accordance with the invention may be included in a recycling ATM. In this case, collection means in the ATM to which accepted deposited notes are fed includes a plurality of stores where each store holds notes of one particular denomination. The notes are sorted in response to the output from a note validator. If a subsequent user wishes to make a withdrawal from the ATM then notes which have been deposited earlier in the collection means may be retrieved from one or more of the relevant stores and passed to the user in fulfillment of his withdrawal request.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit and scope of the invention are desired to be protected. For example, such apparatus could be used for the reception, validation and marking of cheques or vouchers having a designated value.

What is claimed is:

1. A method of processing notes at an automated teller machine (ATM), the method comprising the steps of:

subjecting notes to an acceptance procedure to determine if the notes are genuine;

separating rejected notes from accepted notes;

diverting rejected notes along a transport path to a rejection bin;

transporting the diverted notes along the transport path to the reject bin;

determining which of the diverted notes are counterfeit notes and which of the diverted notes are suspect notes as the diverted notes are being transported along the transport path to the reject bin;

marking counterfeit notes with a first type of marking material so as to render the counterfeit notes unusable; and marking suspect notes with a second type of marking material which is different from the first type of marking material so as to allow the marked suspect notes to be usable again if the marked suspect notes are later proved to be genuine.

2. A method according to claim 1, wherein (i) the first type of marking material comprises an indelible ink, and (ii) the second type of marking material comprises a photo-chromic ink.

3. A method according to claim 1, wherein (i) the first type of marking material comprises an indelible ink, and (ii) the second type of marking material comprises a thermo-chromic ink.

4. A method according to claim 1, further comprising the step of identifying the particular transaction associated with a suspect note.

5. A method according to claim 1, further comprising the step of transmitting rejected note information including counterfeit note information and suspect note information to a host computer which controls operation of the ATM.

6. A method of processing notes which have been deposited at an automated teller machine (ATM) by an ATM customer, the method comprising the steps of:

determining if a deposited note is genuine or non-genuine;

determining if a non-genuine note is a counterfeit note or a suspect note;

marking counterfeit notes with an indelible ink to render the counterfeit notes to be unusable; and marking suspect notes with a non-indelible ink to render the suspect notes to be usable again if the marked suspect notes are later proved to be genuine.

7. A method according to claim 6, wherein the non-indelible ink comprises a photo-chromic ink.

8. A method according to claim 6, wherein the non-indelible ink comprises a thermo-chromic ink.

9. A method according to claim 6, further comprising the step of identifying the particular transaction associated with a marked suspect note.

10. A method according to claim 6, further comprising the step of transmitting counterfeit note information and suspect note information to a host computer which controls operation of the ATM.

11. A self-service note depositing terminal comprising:
a note acceptor for receiving deposited notes;
a note validator for (i) determining if a deposited note is genuine or non-genuine, and (ii) determining if a non-genuine note is a counterfeit note or a suspect note;
a purge bin for receiving counterfeit notes and suspect notes;
a transport mechanism for transporting counterfeit notes and suspect notes to the purge bin;
a first marking device for marking counterfeit notes with a first type of marking material so as to render the counterfeit notes unusable; and
a second marking device different from the first marking device and for marking suspect notes with a second type of marking material which is different from the first type of marking material so as to allow the suspect notes to be usable again if the marked suspect notes are later proved to be genuine.

12. A self-service note depositing terminal according to claim 11, wherein (i) the first type of marking material comprises an indelible ink, and (ii) the second type of marking material comprises a photo-chromic ink.

13. A self-service note depositing terminal according to claim 12, wherein the second marking device includes a staining device for staining suspect notes with the photo-chromic ink.

14. A self-service note depositing terminal according to claim 13, wherein the staining device includes a printer for printing on the suspect notes.

15. A self-service note depositing terminal according to claim 11, wherein (i) the first type of marking material comprises an indelible ink, and (ii) the second type of marking material comprises a thermo-chromic ink.

16. A self-service note depositing terminal according to claim 15, wherein the second marking device includes a staining device for staining suspect notes with the thermo-chromic ink.

17. A self-service note depositing terminal according to claim 16, wherein the staining device includes a printer for printing on the suspect notes.

18. A self-service note depositing terminal according to claim 11, wherein the terminal is in the form of an automated teller machine (ATM).

* * * * *